United States Patent [19]

Greer

[11] Patent Number: 4,994,286

[45] Date of Patent: Feb. 19, 1991

[54] GRAIN CONDITIONING METHOD

[75] Inventor: David G. Greer, Anoka, Minn.

[73] Assignee: AgriChem, Inc., Anoka, Minn.

[21] Appl. No.: 461,339

[22] Filed: Jan. 5, 1990

Related U.S. Application Data

[63] Continuation-in-part of Ser. No. 191,378, May 9, 1988, Pat. No. 4,898,092.

[51] Int. Cl.$^5$ ............................................. G01N 33/00
[52] U.S. Cl. ........................................ 426/231; 73/73; 426/507
[58] Field of Search .................. 426/231, 507; 99/487, 99/516, 536; 73/73

[56] References Cited

U.S. PATENT DOCUMENTS

| | | | |
|---|---|---|---|
| 2,163,628 | 6/1939 | Pilkey | 426/507 |
| 2,237,798 | 4/1941 | Thomas | 99/487 |
| 2,324,874 | 7/1943 | Peters | 99/487 |
| 2,553,788 | 5/1951 | Richardson et al. | 99/487 |
| 3,029,829 | 4/1962 | Glueck | 137/3 |
| 3,148,971 | 9/1964 | MacDonald et al. | 75/758 |
| 3,255,975 | 6/1966 | Malin et al. | 241/34 |
| 3,547,081 | 12/1970 | Geerlings | 119/51.11 |
| 3,587,529 | 6/1971 | Wienert | 119/51.5 |
| 3,684,526 | 8/1972 | Lowery | 99/536 |
| 3,703,861 | 11/1972 | Slack et al. | 99/471 |
| 3,717,086 | 2/1973 | Hough | 99/516 |
| 3,721,179 | 3/1973 | Applegate | 99/487 |
| 3,734,777 | 5/1973 | Bratschitsch | 99/487 |
| 3,809,922 | 5/1974 | Emmons et al. | 137/3 |
| 3,932,736 | 1/1976 | Zarow et al. | 99/487 |
| 3,991,771 | 11/1976 | Banks | 131/134 |
| 4,055,673 | 10/1977 | Mueller et al. | 426/507 |
| 4,064,275 | 12/1977 | Anthony | 426/507 |
| 4,148,325 | 4/1979 | Solomon et al. | 131/134 |
| 4,182,273 | 1/1980 | Peterson | 119/51.5 |
| 4,183,292 | 1/1980 | Banks | 99/468 |
| 4,407,306 | 10/1983 | Hibbitts | 131/302 |
| 4,471,790 | 9/1984 | Davis, Jr. et al. | 131/301 |
| 4,499,111 | 2/1985 | Oetiker et al. | 426/231 |
| 4,572,218 | 2/1986 | Hine et al. | 131/302 |
| 4,628,807 | 12/1986 | Dopp | 99/516 |
| 4,654,802 | 3/1987 | Davis | 364/502 |
| 4,680,957 | 7/1987 | Dodd | 73/55 |
| 4,721,448 | 1/1988 | Irish et al. | 99/487 |
| 4,742,463 | 5/1988 | Volk, Jr. | 99/487 |

FOREIGN PATENT DOCUMENTS 2065492 3/1970 Fed. Rep. of Germany .
2055059 2/1981 United Kingdom .
WO87/06434 11/1987 World Int. Prop. O. .

OTHER PUBLICATIONS

Boonton Polytecnic Company brochure entitled The Boonton Miltrol System from the Moisture Bulletin, vol. 1, No. 5, 1984.

Process Automation Systems brochure published by Agridustrial Electronics, Inc. (Subsidiary of Dickey-John Corp), Jun. 1, 1983, pp. 11-12.

Primary Examiner—George Yeung
Attorney, Agent, or Firm—Burd, Bartz & Gutenkauf

[57] ABSTRACT

A method of increasing the moisture content of seed grain and of feed grain to raise the moisture content to an approximate target moisture content prepatory to planting in the case of seed grain and in order to increase the patentability to the animal in the case of feed grain. According to the method, as grain is moved from a first location toward a second location, the moisture of the grain is continuously measured with a moisture sensor. The moisture sensor generates a control signal which is used to regulate the rate of addition of moisture to the grain at a location downstream of the moisture sensor. The moisture content of the grain measured by the moisture sensor is compared to a target moisture content level and control adjustments are made accordingly in order to regulate the rate of application or moisture to the passing grain.

10 Claims, 3 Drawing Sheets

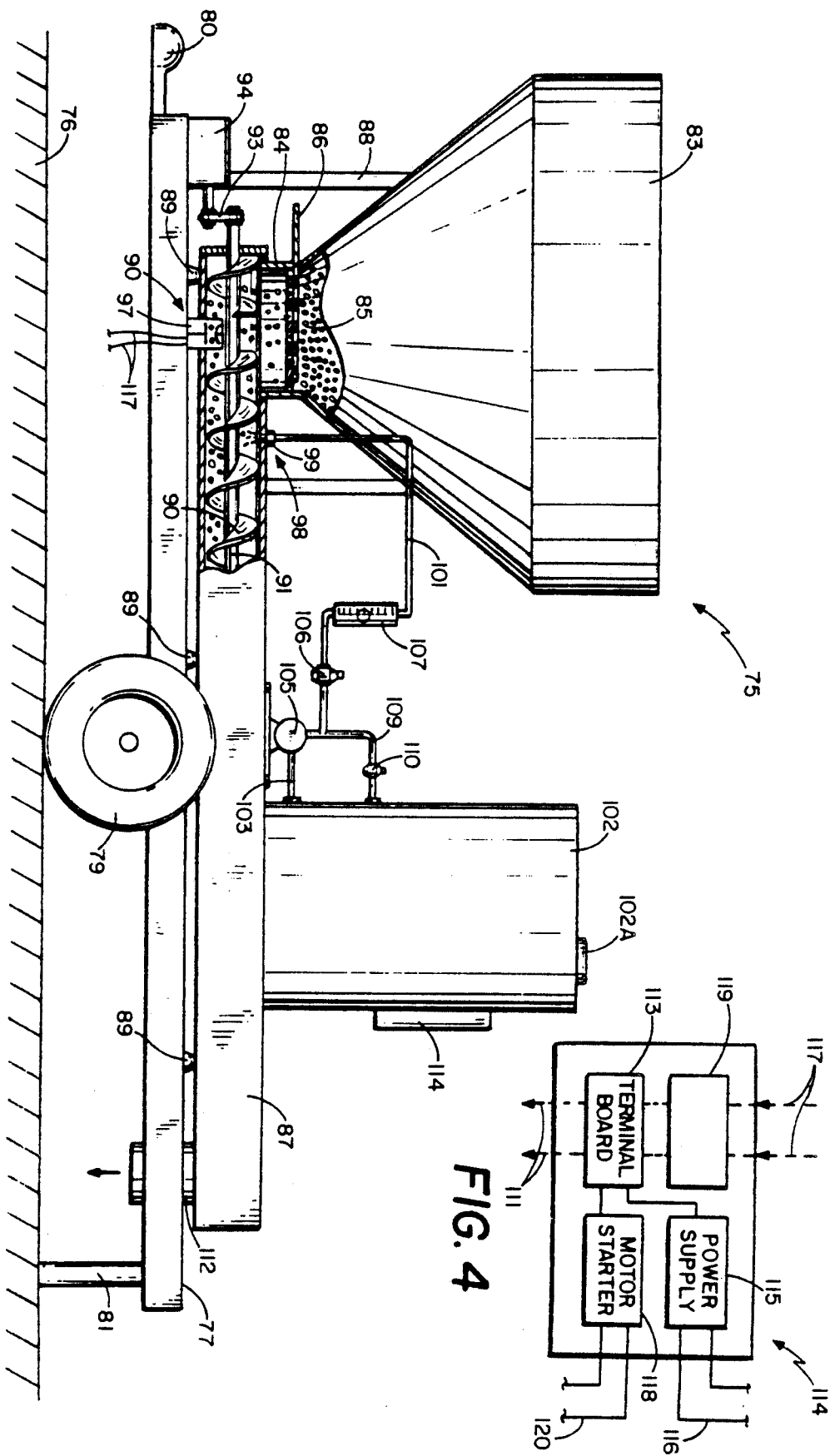

GRAIN CONDITIONING METHOD

CROSS REFERENCE TO RELATED APPLICATION

This application is a continuation-in-part of U.S. application Ser. No. 191,378 filed May 9, 1988 entitled Feed Grain Conditioning Apparatus, now U.S. Pat. No. 4,898,092.

BACKGROUND OF THE INVENTION

The invention relates to a method of conditioning grain, both feed grain and seed grain, to raise the moisture content of the grain to an approximate target moisture content. Feed grain moisture content is critical to the quality and palatability of the finished feed. It also has a significant impact on the ease with which it is processed into feed, but has been a largely uncontrollable variable in the feed manufacturing process. Moisture levels encountered typically range beteen eight and sixteen percent in stored grain. New crop grain can have moisture levels in excess of twenty percent. A feed manufacturing facility will commonly process several hundreds of tons of feed grains each day that have been purchased from many sources. Within a matter of minutes the moisture content of the grain being processed can vary several percentage points. Without regulated moisture addition, a highly varible feed product is produced.

Feed grain processing in the manufacturing of finished livestock feeds is intended to increase the feed value of the grains in terms of palatability and digestibility. Swine and beef cattle feeds are commonly prepared with dry processed grains. Simple processing involves either the grinding or dry rolling of the whole kernel grain to fracture the seed coat and to increase the surface area of the grain particles for more efficient digestion. Grain moisture content greatly affects the texture of the final products produced by these dry methods. Very dry grain will tend to make flour, which the animals will not eat, rather than the desired larger particle. This flour, or dust, represents a safety hazard in the feed mnufacturing facility, both from the explosion potential and from workers breathing it. It also represents a loss of inventory to the feed manufacturer. Careful control of the moisture level of the grain entering these dry processes can eliminate dust and help to produce a uniform particle size that will improve digestion without being so small as to depress consumption.

A more sophisticated method of processing feed grains involves cooking them with steam before they are passed through a roller mill. The cooking partially gelatinizes the starch in the grain, increasing its digestibility. The rolling increases surface area of the grain kernel by pressing it into a flat "flake". Beef and dairy cattle feeds are commonly steam flaked. Whole kernel grain flows through a chamber into which live steam is injected. Once "cooked", it passes through a roller mill, producing a "flake". If the grain is too dry, the cooking or gelatinizing will be incomplete, since the gelatinizing process requires both heat and moisture. The grain kernel will be hard and require more energy to roll than a moist, properly cooked kernel. The final flake will be dry and brittle. Subsequent handling of the flake will cause it to break, resulting in "fines" that the animal will not eat readily.

A second processing method involving steam cooking of the grain is pelleting, which is commonly used to prepare poultry feeds. The grain is ground to a uniform texture, mixed with other feed ingredients and treated with steam. The resulting mash is extruded through a die in a pellet mill. As with steam flaking, gelatinization and toughness of the final feed form, are greatly influenced by the moisture content of the grains being processed. The power required to drive the pellet mill is also affected by the moisture content of the mash. If it is too dry, more power will be required to extrude the pellet, the cooking will be incomplete and the feed ingredients will not bond well, causing a weak pellet that falls apart. Broken pellets become "fines" that are not eaten and represent a loss to the livestock producer.

Seed grain requires moisture for germination. According to usual agricultural practice, when row crops are planted, the seed is typically placed in the top one-half to two inches of soil. Before the seed can germinate, it must absorb sufficient moisture for germination from the surrounding top soil, a process that requires at least several days. If the top soil is particularly dry, this process occurs at an even slower rate or, at times, not at all. Within any given field the soil moisture conditions can range from very wet to quite dry. These variations at planting greatly affect the rate of germination of the seed and consequently the maturity and yield at harvest. Also during the germination period the seed is more susceptible to mold, and the seed bed to erosion from wind and water. In those climates where the growing season is already short, or when extreme wheather conditions shorten the usual growing season, these days added for germination can be a critical factor in the quality of the harvest. Gardners for many years have planted seeds soaked in water overnight to increase the rate of germination. This has never been a practical process commercially due to problems encountered when handling wet grain in bulk. The individual kernels adhere to each other or "bridge" which inhibits the flow of the grain.

SUMMARY OF THE INVENTION

The invention relates a method for continuous, on-line moisture content monitoring and precisely calibrated adjustment of the moisture content of feed grains prepatory to manufacture of livestock feeds and of seed grain prepatory to planting. The moisture is added to the feed grain for purposes of making the finished product more palatable to the animal. It is added to seed grain prepatory to planting to accelerate germination. A continuous flow moisture sensor that is positioned to receive and measure the moisture content of a sample of passing grains is used to generate an electronic signal indicative of the grain moisture content as the grain flows or is moved through the sampling site. A moisture application apparatus is provided for regulated addition of moisture to the grain and receives the electronic signal generated by the moisture sensor. This signal is used as a control signal to adjust moisture addition rate necessary to bring the grain moisture to an approximate target moisture content. The added moisture may be in the form of steam, hot or cold water, or a water-surfactant mixture, and is metered into a mixing or contact chamber through which the grain flows. In a preferred embodiment, the moisture is added to the grain in a mixing chamber such as an auger housing where the water mixture is thoroughly mixed with the grain.

The moisture content of the grain sensed by the moisture sensor is compared to a target moisture content level at a control station and control adjustments are made accordingly in order to regulate the amount of moisture added to the grain to bring it to the target moisture content. The amount of moisture added to the grain can be regulated a number of ways. The amount of moisturizing agent added to the grain can be modulated by increasing, decreasing or maintaining it constant, according to the difference between the moisture level sensed by the sensor and the target moisture level. Alternatively, the speed of a conveying means moving the grain can be modulated by an increase or decrease while the spray product flow is held constant. Alternatively, the rate of grain released from a storage facility to the conveying means can be increased, decreased or held constant. A combination of controls can be used, although any one is sufficient.

The addition of moisture to seed grain can extend the effective growing season of the crop by as much as 10 days. In drier years, the conditioning of the seed grain might allow growth of the crop that would otherwise not occur. The accelerated germination of the seed grain results in a reduced exposure of the seed bed to erosion from wind or water. There is reduced evaporative moisture loss from the soil. There is a more uniform maturity of crop at harvest. The crop yield at harvest is increased. The accelerated germination results in a reduced opportunity for mold to develop and harm the seed which can reduce or eliminate the need for toxic fungicides to be applied to the seed bed.

The moisture applied to the seed grain can be water or a mixture of water and a nutrient or water and a surfactant, or both.

IN THE DRAWINGS

FIG. 3 is a side elevational view of another form of a grain moisturizing apparatus for practice of a method of the invention for conditioning seed grain, shown in a portable configuration readily transportable from place to place and with portions cut away for purposes of illustration; and FIG. 4 is a schmematic vieew of the control box of the seed grain moisturizing apparatus of FIG. 3.

DESCRIPTION OF PREFERRED EMBODIMENTS

Figure 1:
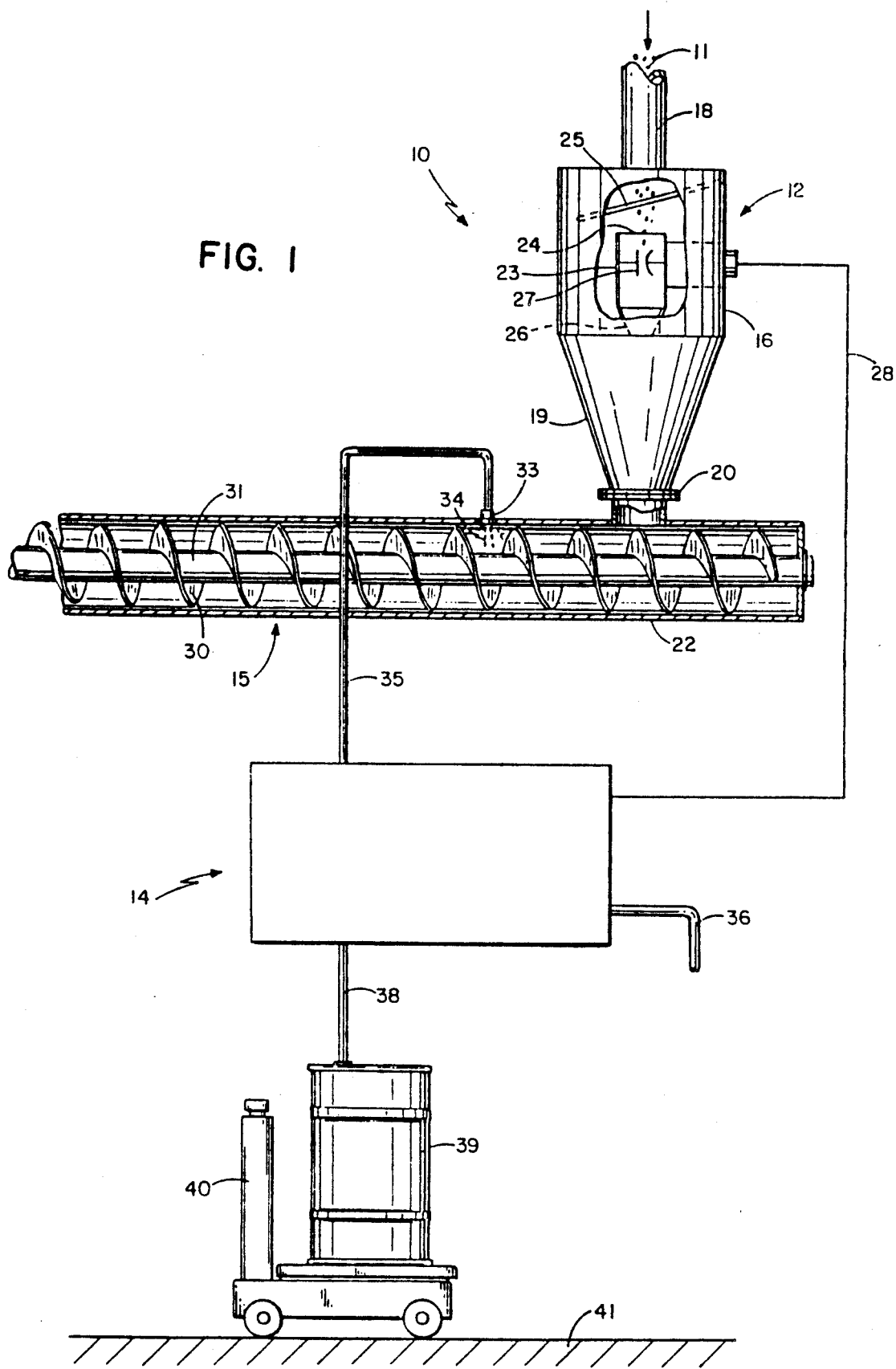
FIG. 1 is a schematic view of a grain moisturizing apparatus for practice of a method of the invention for conditioning of feed grain and shown partly fragmented for purposes of illustration.
Figure 2:
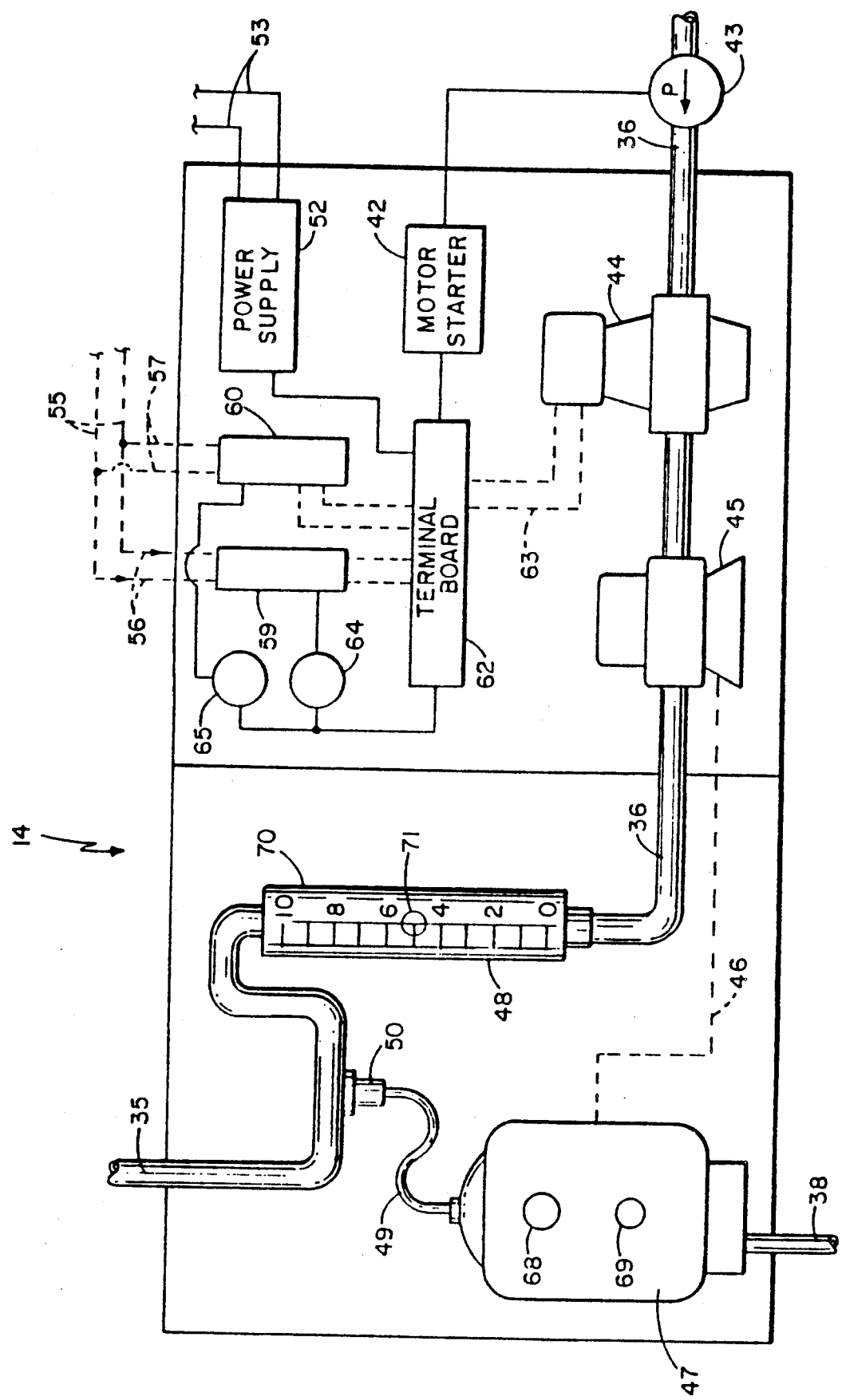
FIG. 2 is an enlarged schematic view of the control station of the grain moisturizing apparatus of FIG. 1.

Referring to the drawings, there is shown in FIG. 1 the grain moisturizing apparatus for practice of a method of the invention for conditioning feed grain, indicated generally at 10 positioned to intercept flowing feed grain 11 for conditioning it through the addition of water either alone or mixed with a fluid additive such as a nutrient, a surfactant or a flavoring agent. Grain 11 is feed grain such as milo, corn, oats, barley or wheat, that has a relatively low initial moisture content. The purpose of the addition of the wetting agent is to bring the moisture content up to a uniform target level, for example, 18–18.5 per cent, so as to be more palatable to the animal and more readily digested by the animal, yet not to exceed that desired moisture level. The grain as introduced to apparatus 10 will be of varying moisture content. Grain that has been in storage will usually have a relatively low moisture content, while grain more freshly harvested will usually be somewhat higher. Apparatus 10 continuously senses and monitors the moisture content of the passing grain and adjusts the amount of wetting agent and moisture added.

Grain 11 is flowing from a location of origin such as a storage bin, an elevator or a grain truck, and is traveling or flowing in a downstream direction of travel to a destination such as a surge bin, roller mill, steam chamber, a feed mixer or the like, preparatory to being fed to livestock. The grain flow is directed through the moisturizing apparatus 10 for conditioning. The grain travels past a sensing station 12 where a sample is diverted through a moisture sensor. Sensing station 12 is located upstream of the grain flow with respect to a wetting station 14. The grain is transferred from the sensing station 12 to and beyond the wetting station 14 by a mixing and transfer apparatus 15. In apparatus 15 grain is not only moved along to the destination location, but the wetting agent is thoroughly mixed into the grain.

Sensing station 12 includes a sensor mounting box or housing 16. The outlet end of a grain conveyor or pipe 18 connects to the inlet end of housing 16 for transfer of the entire amount of flowing grain through the interior of housing 16. The lower or outlet end of housing 16 has a downwardly divergent, truncated conical outlet section 19 assembled by a flanged connection 20 to an auger housing 22 forming a part of the mixing and transfer apparatus 15. The grain 11 having a measurable moisture content flows from the origin location through the grain conduit pipe 18, then through the interior of sensor mounting housing 16 to the interior of auger housing 22.

A moisture sensor apparatus 23 is installed within the interior of the sensor housing 16 in intersecting relationship to a portion of the passageway of the grain 11 as it travels toward the auger housing 22. Moisture sensor apparatus 23 has an inlet opening 24 perpendicular to the longitudinal direction of flow of grain 11 and positioned to intercept a sample of the grain 11 as it passes through the housing 16. Scalper bars 25 are fixed to the interior sidewall of the housing 16 and extend over the upstream projection of inlet opening 24. Scalper bars 25 form a rake-like barrier of parallel bars spaced apart a distance sufficient to permit passage of grain 11 but deflect foreign objects that may be entrained with grain 11 such a padlocks, pieces of chain or metal and the like. The moisture sensor 23 has an outlet 26 in longitudinal alignment with the inlet 24 to permit return of the sample of grain directed through the sensor to the mainstream of grain flow. While within the moisture sensor 23, the moisture of the passing grain is detected by any common and preferred type of sensing mechanism. For example, a capacitor 27 can be mounted in the passage of the moisture sensor 23, having spaced apart capacitive plates positioned generally parallel to the flow of grain such that a grain sample flows between them. The capacitence between the plates will vary according to the moisture content of the passing grain. By passing grain samples of known moisture content through the capacitor 27, the electronic output can be calibrated for a particular grain. The electronic signal can be in terms of a voltage. The higher moisture content of the grain, the greater the ability to conduct current across the capacitance plates. A typical calibration could be a voltage output of between 0 and 4 volts over the the typical range of moisture content being measured. The output signal from the moisture sensor 23 is carried by electrical line 28 to the control station 14. The moisture sensor 23 provides continuous monitoring of the moisture content of grain passing from the conveyor 18 and through the sensor housing 16.

The grain sample deflected through the moisture sensor apparatus 23 is returned to the normal grain stream at outlet 26 and travels to the flanged inlet 20 of the mixing apparatus 15. Mixing apparatus 15 includes a tubular auger housing 22 having an auger flight 30 installed on an auger shaft 31 that is driven by suitable power such as an electric motor (not shown) at a controlled speed. The grain travels from the inlet 20 through the longitudinal length of the auger housing 22 to a discharge end for further processing or conveying to the destination location. A water-wetting agent mixture is applied to the grain in the auger housing 22 in an amount calibrated according to the electronic output provided by the moisture sensor 23. Auger flight 30 serves to thoroughly mix the water mixture and the grain preparatory to consumption by the animal.

Means for introduction of the water mixture to the grain comprises a spray nozzle 33 carrying water mixture in the form of pressurized spray product 34 and mounted on the side of auger housing 22. The liquid is delivered by a liquid line 35 extending from the control station 14, and is derived from a water supply line 36 and an additive supply line 38. The additive supply line 38 extends from control station 14 to a container 39 of additive such as a wetting agent. Container 39 rests on a commercial scale 40 supported on ground surface 41 for purposes of determining depletion of container 39. Spray product 34 is thoroughly mixed in with the passing grain by the auger flight 31 as it travels through the auger housing 22 to its destination. Other means for mixing the spray agent with the grain could be used such as mixing in a bin, a hopper or a conveyer belt moving the grain from the sensing station to the final destination.

Referring to FIG. 2, water supply line 36 derives a supply of water under pressure from a remote water pump 43 as might be associated with a well, or from water tanks or a public water supply or the like. Water line 36 extends through an automatic water valve 44 that is under the control of the moisture sensor 23, and to the water meter pulsar 45. Water meter pulsar 45 produces an electrical control signal according to the water flow that is carried by signal line 46 to a chemical metering pump 47. The water supply line 36 extends from the water meter pulsar 45 through a flow guage 48 and to the fluid supply line 35 leading to the spray nozzle 33. A delivery tube 49 extends from the chemical metering pump 47 to a fitting 50 connected to the water supply line 36 for introduction of an additive to the water supply. The additive is supplied to the chemical metering pump 47 by the additive supply line 38 extending from the additive container 39 shown in FIG. 1.

A power supply 52 provides power to the moisture sensor 23 through power lines 53, and to other electrical components located at control station 14. The output voltage of the moisture sensor is carried by main signal lines 55 through the electrical conduit 28 back to the control station 14. A first signal control branch 56 carries the signal voltage to a first signal converter terminal 59. The first signal converter terminal 59 converts the voltage signal to an amperage signal measureable in milliamps for control of the water valve 44. The milliamps signal output from the first signal control terminal is fed to a terminal board 62. Terminal board output lines 63 extend from the terminal board 62 to the automatic valve 44. The first signal converter terminal 59 is calibrated according to one type of grain being processed. For example, the first signal converter terminal 59 can be calibrated for corn. The calibration is with reference to corn at a target moisture level. When the feed lot or operator is processing corn, the operator activates the first signal converter terminal 59.

A second branch 57 carries the voltage signal output of the moisture sensor 23 from the the main signal line 55 to a second signal converter terminal 60. The second signal converter terminal 60 is also connected to the terminal board 62. Second signal terminal converter 60 is calibrated according to a second type of grain such as milo. This calibration will differ from that for the first signal converter terminal due to the differing characteristics of the two grains. Accordingly, when the operator of the apparatus is conditioning the second grain, the second signal converter terminal 60 will be actuated to the exclusion of the first signal converter terminal 59. The second signal converter terminal 60 converts the input voltage to an amperage, for example, in the range between 0–20 milliamps which is transmitted to the terminal board 62. Signal converter terminal is calibrated with respect to a target moisture content of the grain to open or close the automatic valve in an amount according to the voltage sensed by the moisture sensor for the particular grain being processed. First signal converter terminal 59 is controlled by a relay or switch 54. The second signal converter terminal 60 is actuated by a second relay or switch 65. Each signal converter terminal operates to the exclusion of the other, i.e., only one at a time can be actuated. The moisture sensed by the moisture sensor 23 is relayed to one of the signal converter terminals, then to the terminal board 62 before passing the signal through the output branch 63 to the automatic valve 44.

Water meter 45 measures the volume of water flow through the water line 36 and converts the information to an electrical signal that travels through signal line 46 to the additive meter pump 47 which pumps a correct or desired amount of additive through the connecting line 49 proportionate to the volume of water. Water meter 45 can be of the pulsar variety having a turbine mounted magnet that rotates responsive to water flow generating a programmable electrical pulse transmitted to the metering pump to actuate the pump according to the volumetric water flow. Alternatively the metering pump 47 can also be controlled from the same signal that drives the control valve. Metering pump 47 has a stroke length control 68 and a frequency control 69 to regulate the rate of addition of additive to the water supply.

Flow meter 48 gives visual indicia of the water flow rate for reference purposes. Flow meter 48 comprises a vertical, transparent tubular member calibrated from bottom to top and open for passage of water. A ball or other weighted member 71 is located in the passage of tubular element 70 and is pushed upward along the sideways calibrations on the tubular member 70 according to the flow rate of the water. Other flow rate meters could be employed.

In the use of the grain moisturizing apparatus 10, the signal converter terminals are each calibrated according to a type of grain. For example, most feed lots condition one or two types of grains, but generally not more. The first signal converter terminal can be calibrated according to conditioning of corn, and the second for milo, or other grains. Grain samples with known moisture contents are passed through the moisture sensor, and the siganl is measured. The grain sample can have a known moisture content as determined by AOAC standard laboratory methods. This is repeated for numerous data points. Thereafter, when the calibrated voltage is sensed by the moisture sensor, the moisture content of the grain is known. The automatic valve 44 is programmed to open or close according to a voltage sense signal directed to it. The voltage signal will be from one if the first or second signal converter terminals.

Grain from an origin location is passed through the grain pipe or conduit 18 through the sensor mounting housing 16. A sample of the grain, for example 4 or 5 per cent of the grain, passes through the moisture sensor chamber defined by the sidewalls of moisture sensor 23, and then through the moisture sensor outlet 26 to be reunited with the main grain stream. The moisture content of the passing grain is sensed in moisture sensor 23. The information is transmitted through the main signal line 55 in electrical conduit 28 to the control station 14. The signal is diverted through either the first or second signal converter terminals, then through the terminal board 62 and the signal connecting line 63 to the automatic pump 44. A delay circuit can be interposed to account for the time lag for the grain to travel from the moisture sensor station to the wetting station at the spray nozzle 33. The automatic valve 44 opens, closes or remains in position according to the signal being sensed. The water flow is sensed by the water meter 45 which transmits a signal accordingly to the additive pump 47 and actuates the additive pump 47 to deliver a controlled amount of additive to the water supply at the fitting 50 to be added and mixed with the water in fluid supply line 35. The mixture then passes through the spray nozzle 33 into and is mixed with the grain, conditioning it preparatory to being fed to the animals. The additive is derived from the additive container 39 and delivered through the additive supply line 38 to the metering pump 47.

FIG. 3 shows a seed grain conditioning apparatus 75 for practice of another form of the method of the invention comprised as a portable unit for movement over ground surface 76 and for that purpose including an elongate trailer frame 77 mounted for movement upon trailer wheels 79 when under tow at a forwardly mounted trailer hitch 80. When stationary, trailer frame 77 can be supported by suitable support legs 81. Alternatively, grain conditioning apparatus 75 could be mounted at a fixed installation.

A seed grain holder device is comprised as a hopper 83 having downwardly convergent side walls and an outlet mounted on top of a downspout 84. Legs 85 help support hopper 83 on trailer frame 77. Hopper 83 can hold, by way of example, 500 pounds of seed grain 85. Means are provided for regulating the discharge rate of seed grain from hopper 83 to the discharge downspout 84. A slide gate 86 is installed between the outlet of the hopper 83 and the inlet of downspout 84. Slide gate 86 includes a fixed plate and a moveable plate mounted on top of the fixed plate. Each plate has a plurality of apertures. The movable plate is movable between positions of covering and uncovering relationship to the apertures of the fixed plate. The movable plate is movable to intermediate positions between the closed and open positions to regulate the amount of seed grain moving from the hopper 83 through the downspout 84.

Seed grain conveying means includes an auger assembly having an elongate tubular auger housing 87 mounted on trailer frame 77 by housing supports 89. An elongate auger flight 90 is rotatably mounted in auger housing 87 on an auger shaft 91. An end of auger shaft 91 extends axially outward of housing 87 and is connected by drive transmission 93 to the output shaft of a variable speed electric motor 94.

Downspout 84 is mounted on one end or the upstream end of auger housing 87 and is open to auger housing 87 for discharge of seed grain from hopper 83. Seed grain 85 discharged from hopper 83 through downspout 84 enters auger housing 87 and is moved in a downstream direction by the rotating auger flight 90 upon operation of electric motor 94. By way of example, the auger assembly can move up to fifty pounds of seed grain per minute.

Seed grain 85 introduced into the end of auger housing 87 will be of varying moisture content. The object of apparatus 75 is to bring the moisture content of the seed grain up to an approximate target moisture content considered optimal to promote early germination of the seed grain once it is planted. Apparatus 75 continuously monitors the moisture content of grain introduced to the grain conveying means and employs this measurement to make adjustment as may be necessary in the rate of moisture application to the seed grain to bring it to the desired moisture content. The addition of too little moisture results in not totally accomplishing the desired objective of early germination or that of a uniform growth of crop upon harvest time. Since the moisture applied to the seed grain can also contain surfactant or nutrient solutions, the addition of too much moisture is wasteful. Too much moisture will soften the seed excessively, making it difficult to handle and very susceptible to damage by mechanized planting.

A moisture sensing station 95 is located in operative proximity to the auger assembly to intercept a sample of passing seed grain for the purpose of measuring the moisture content of it. Moisture sensing station 95 includes a moisture sensor 97 mounted with respect to auger housing 87 and extending a short distance into the interior thereof positioned so that a portion of grain being moved by the auger flight 90 passes through the moisture sensor 97. A section of the auger flight 90 is removed at the sensing station 95 in order to provide clearance for the moisture sensor 97. Sensing station 95 is located at or near the discharge of hopper 83. It could alternatively be located in downspout 84 or in hopper 83. The moisture sensor 97 can be of any suitable conventional variety. For example, moisture sensor 97 can be of the capacitance type having a plate positioned generally parallel to the flow of grain such that a sample of feed grain passes over it. The capacitance will vary according to the moisture content of the passing seed grain. By passing seed grain samples of known moisture content through the capacitance plates, the electronic output is calibrated for a particular type of seed grain. The electronic signal generated can be either in terms of a voltage or amperage. The higher moisture content of the seed grain, the greater the signal generated. A typical calibration could be a voltage output of between zero and four volts over the typical range of moisture content being between eight and twenty per cent.

A wetting station 98 is located downstream of sensing station 95 in operative proximity to the auger assembly. A spray applicator or nozzle 99 is installed in the wall of auger housing 87 at wetting station 98. Applicator 99 directs moisture preferably in spray form to the interior of auger housing 87 at wetting station 98 in order to apply moisture to passing seed grain. Applicator 99 derives wetting agent through a liquid line 101.

A liquid reservoir or tank 102 is mounted on frame 77 and contains a supply of liquid for application to the seed grain. Liquid contained therein can be water, or a mixture of water and a surfactant or a nutrient or both. An outlet line 103 extends from a lower portion of the liquid tank 102 to a fluid pump 105. The outlet of the fluid pump 105 is connected to one end of the liquid line 101 and also to a return line 109. An automatic valve 106 is located in liquid line 101. A solenoid valve or return valve 110 is connected in the return line 109 which returns again to the interior of the supply tank 102. The purpose of return line 109 is to provide a mixing function for the ingredients in the tank 102. Valve 106 can be totally closed and return valve 110 open whereby mixture is pumped by pump 105 from the outlet 103 through return line 109 to agitate and mix liquid in the tank 102 as is commonly done in certain agricultural applications. Under normal working conditions when seed grain is being processed, the return valve 110 will be closed and fluid will be pumped through the adjustable valve 106.

Valve 106 is adjustable with respect to the flow rate of fluid passing through it. A flow meter 107 is installed in the fluid line 101 downstream of the adjustable valve 106. Flow meter 107 indicates the flow rate of liquid pumped through the adjustable valve 106. The flow meter used to measure the liquid flow is a rotameter type. However any flow meter suitable for measuring water flow may be used successfully. This could include magnetic flow meters, paddlewheel or turbine flow meters, or one yet to be invented. The rotameter type is inexpensive and rugged enough to withstand jostling when the unit is moved. In a large scale commercial process, a magnetic flow meter could be used, since it generates an electronic signal usable to record water use or to notify the operator of a malfunction.

Downstream of the wetting station 98 is a mixing area for the mixing of the moisturizing agent and the seed grain. In the configuration shown, the mixing area comprises simply an extension or span of the auger housing 25 whereby the action of the auger flight in moving the feed grain toward the downstream end of the auger housing 87 is effective to mix the wetting agent with the seed grain. A discharge chute 112 is located at the end of auger housing 87 for discharge of treated seed grain prepatory to planting.

The application rate of wetting agent or moisture to the seed grain is precisely and continuously regulated according the measured moisture content of the seed grain as discharged from the hopper. The application rate can be controlled by alternative means. Motor 94 can be variable speed, holding constant the moisture discharge rate at the nozzle 99 and the seed grain discharge rate through the downspout 84. Variation of the speed of the motor 94 varies the speed of rotation of auger flight 90 and the rate of seed grain passing under the nozzle 99. The speed of motor 94 can be controlled or modulated according to the electronic output signal of the moisture sensor 97. As a second means, the amount of wetting agent provided through the nozzle 99 can be varied or modulated according to the measured moisture content of the seed grain. This can be controlled through the automatic valve 106 responsive to signals generated by the moisture sensor 97. As a third means, the amount of seed grain discharged through the slide gate 86 ca be controlled or modulated according to the sensed moisture content of the seed grain at sensing station 95. An increase of discharge of seed grain through the downspout 84 will result in a lower moisture application rate. A decrease will result in an increased application of moisture to the seed grain passing through the wetting station 98. Slide gate 86 as shown in FIG. 1 is operable manually, but could be operated as well by a suitable motor.

A control station or panel 114 is located on trailer frame 77 and, as shown, can be mounted on liquid reservoir tank 102. Control station 114 is shown schematically in FIG. 4. It includes a signal converter terminal 119, a power supply 115, a motor starter 118 and a terminal board 113. The electronic output of moisture sensor 97 is carried by main signal lines 117 to the signal converter terminal 119. The signal converter terminal 119 converts the voltage signal to an amperage signal measurable in milliamps for control of a control variable to regulate the rate of moisture addition to the seed grain. The voltage signal generated by the moisture sensor electronics could be used as a direct control signal. It is converted from the DC volt signal to a DC amperage signal because milliamps controllers are more readily available and slightly less expensive. This control could be comprised as, for example, modulation of the speed of auger motor 95, modulation of the valve opening of automatic valve 106, or control of a motorized open and shut mechanism for slide gate 86. The output from the signal converter terminal 119 is directed to terminal board 113 and then through output line 111 to the control mechanism. The signal converter terminal 119 is calibrated with the moisture sensor 97 according to a type of seed grain, for example, seed corn. The calibration is made with respect to a single control variable. For example, the output of terminal board 113 can extend to the control of variable speed motor 94 controlling the speed of auger flight 90. With slide gate 86 open at a constant setting and automatic valve 106 at a constant setting, calibration of signal converter 119 is conducted for seed corn. Seed corn at various known moisture contents, including the target moisture content, is passed through the moisture sensor 97 and the electronic output signal is recorded. A second calibration is made to calibrate the auger speed required to raise the moisture content of the seed grain to a target moisture content. The resultant calibration, that of any needed adjustment of rate of moisture application to the seed grain to bring it to the target moisture content, as controlled by modulation of the auger speed, is programed in the signal converter terminal. Alternatively, the calibration could be had with respect to varying the slide gate opening or the automatic valve opening or even a combination of control variables, although any one is sufficient. Calibrations can be made with respect to different types of seed grain. A multiple of signal converter terminals can be provided at the control station as shown in parent U.S. patent application Ser. No. 191,378 filed May 9, 1988.

In use, the liquid mixture is introduced to the tank 102 through a suitable air vented cap 102A. If the mixture includes ingredients other than water, such as a nutrient, surfactant or steroid, in solid or liquid form, the circulating loop can be used to mix the ingredients. Automatic valve 106 is closed and return valve 110 is opened. Pump 105 is operated to circulate the mixture through the outlet 103 and back through the circulating line 109 for a suitable period of time to assure mixing.

A supply of untreated seed grain is placed in the hopper 83. Return valve 110 is closed and automatic valve 106 is opened. Power supply 115 provides power to the moisture sensor 97 through the power lines 116, and to other electrical components located at control station 114. Slide gate 86 is opened a predetermined amount. Auger motor 94 moves seed grain through the auger housing 87 by means of the auger flight 90. A sample of a seed grain continuously passes through moisture sensing station 95 where the moisture content is measured by the moisture sensor 97. The electronic signal generated by the moisture sensor is carried by the main signal lines 117 to the control station 114. The signal converter terminal 119 converts the voltage signal to an amperage signal which passes through terminal board 113 through signal control line 111. Signal control line 111 extends to a variable control, for example, a variable speed control on the auger motor 94. Power to the pump 103, the valve 106 and auger motor 94 can be controlled by motor starter 118 through power lines 120 deriving signals from the terminal board 113. The speed of the motor 94 is regulating by modulation according to the moisture content sensed by the moisture sensor 97. The speed of motor 94 increases, decreases or stays the same according to the electronic signal generated by the moisture sensor 97 and converted at the signal converter terminal 119. The treatment mixture is pumped out of the chemical tank 102 by pump 105 through the spray nozzle 99 at the wetting station 98. The rate of application of moisture to the seed grain is controlled by the electronic signal generated by the moisture sensor. The flow rate can be monitored through observation of the flow meter 107. Downstream of the wetting station 98 the moisture and seed grain are thoroughly mixed in the auger housing 87. The treated seed grain is discharged through the discharge chute 112 for transfer to a means of conveyance for planting. The treated seed grain has acquired sufficient moisture for germination resulting in the more rapid development of an effective root system. This can shorten the effective growing season of the crop by as much as 10 days. In a particularly dry year, the rapid penetration of the subsoil by the root system can allow growth of the plant that would otherwise not occur. The rapid emergence of the plant reduces exposure of the seed bed to erosion from wind or water, results in reduced evaporative moisture loss from the soil, a more uniform stand of crop, and more uniform maturity at harvest. The yield at harvest is greater. For example, with respect to corn, the rows of kernels are longer resulting in greater yield per acre. There is a reduced opportunity for mold to develop and harm the seed, thus reducing or actually eliminating the need for application of toxic fungicides.

While there has been shown and described particular embodiments of the method of the invention, it is apparent that other forms can be practiced without departing from the scope of the invention. The physical conformation of the apparatus to practice the method may be mobile, mounted on either a trailer, a skid, or attached to another piece of movable equipment, such as a truck. Alternatively, it may be stationary, set on a concrete pad or other mounting structure. The materials of construction are critical only if a highly corosive ingredient is included in the treatment mixture. Then the construction materials are chosen to withstand that particular ingredient.

The embodiments of the invention in which an exclusive property or privilege is claimed are defined as follows:

1. A method of conditioning a type of seed grain to stimulate early germination through regulated application of liquid in order to increase the moisture content of the seed grain to an approximate target moisture content, comprising the steps of:
   providing a storage container mounted on a frame for holding a supply of seed grain at a first location on the frame prepatory to liquid addition;
   continuously moving seed grain from the first location along a path toward a second location on the frame;
   providing a moisture sensor on the frame specifically calibrated to measure moisture content of the type of seed grain to be conditioned;
   substantially continuously measuring the moisture content of a sample of passing grain with the moisture sensor at a first station on the path of movement of the passing seed grain;
   applying liquid comprised as a mixture of water and a surfactant type solution to the passing seed grain at a second station on the path of movement of passing grain downstream from the first station; and
   regulating the application rate of liquid to the grain at the second station according to the moisture content of the grain measured at the first station.

2. The method of conditioning grain of claim 1 wherein: regulating the application rate of moisture to the grain includes regulating by modulating the amount of liquid applied to the passing grain at the second station.

3. The method of conditioning grain of claim 1 wherein: regulating the application rate of moisture to the grain comprises modulating the speed of movement of the grain from the first location toward the second location.

4. The method of conditioning grain of claim 1 wherein: regulating the application rate of moisture to the grain includes modulating the amount of grain deposited at the first location for movement toward the second location.

5. The method of conditioning grain of claim 2 including: using an automatic valve connected to the moisture sensing apparatus and to a liquid supply to modulate the amount of liquid applied to the passing grain at the second station.

6. The method of conditioning grain of claim 3 including: using an auger assembly for movement of the grain along at least a portion of the path from the first location toward the second location, driving the auger assembly with a variable speed motor, and modulating the speed of movement of the grain comprises modulating the speed of the variable speed motor.

7. The method of conditioning grain of claim 6 including: mixing the grain and the liquid at a location downstream of the second station.

8. The method of conditioning grain of claim 7 including: storing the grain in holding means adjacent the first location, and modulating the amount of grain deposited at the first location for movement toward the second location comprises regulating the amount of grain released from the holding means.

9. A method of conditioning a type of feed grain as it is moved from an upstream location along a path toward a downstream location, through regulated addition of moisture drived at least in part from a water supply, in order to increase the moisture content of the feed grain to bring it to an approximate target moisture content, comprising the steps of:

provide a moisture sensor specifically calibrated to measure moisture content of the type of feed grain to be conditioned;

measuring the moisture content of a sample of the moving grain at a first station on the path of travel of the grain, using the moisture sensor to substantially continuously monitor the moisture content of moving grain and translate the measurement into a substantially continuously generated electronic signal;

providing moisture to the passing grain using a liquid applicator apparatus at a second station located downstream of the first station with respect to the direction of grain movement;

providing liquid to the liquid applicator apparatus through a liquid line extended from a water supply;

providing an automatic valve in the liquid line of the type having an electronic valve control for regulating the opening and closing of the valve to regulate water flow through the valve by an electronic signal;

controlling the valve control of the automatic valve with the electronic signal generated by the moisture sensor to modulate the flow of water to the liquid applicator apparatus according to the moisture content of the grain sample sensed by the moisture sensor;

introducing a liquid additive into the liquid supply line in an amount according to the volumetric flow of water in the liquid supply line;

providing an auger assembly of the type having an auger housing and an auger located in the auger housing for movement of the grain along at least a portion of the path of movement of the grain from the first location toward the second location, and applying moisture to the passing grain at a second station located on the auger housing.

10. The method of conditioning feed grain of claim 9 including: using a capacitence type moisture sensor to measure the moisture content of the grain.

* * * * *

UNITED STATES PATENT AND TRADEMARK OFFICE
CERTIFICATE OF CORRECTION

PATENT NO. : 4,994,286

DATED : February 19, 1991

INVENTOR(S) : DAVID G. GREER

It is certified that error appears in the above-identified patent and that said Letters Patent is hereby corrected as shown below:

Abstract, line 5, "patentability" should be --- palatability ---

Abstract, line 15, "or" should be --- of ---.

Col. 1, line 20, "beteen" should be --- between ---.

Col. 1, line 43, "mnufacturing" should be --- manufacturing ---.

Col. 2, line 42, following "relates" insert --- to ---.

Col. 2, line 46, "prepatory" should be --- preparatory ---.

Col. 2, line 49, "prepatory" should be --- preparatory ---.

Col. 3, line 47, "vieew" should be --- view ---.

Col. 4, line 46, "a" should be --- as ---.

Col. 7, line 10, ""if" should be -- of ---.

UNITED STATES PATENT AND TRADEMARK OFFICE
CERTIFICATE OF CORRECTION

PATENT NO. : 4,994,286

DATED : February 19, 1991

INVENTOR(S) : David G. Greer

It is certified that error appears in the above-identified patent and that said Letters Patent is hereby corrected as shown below:

Col. 9, line 68, "ca" should be --- can ---.

Col. 10, line 51, "programed" should be --- programmed ---.

Col.11, line 22, "regulating" should be --- regulated ---.

Col. 12, line 11, "prepatory" should be --- preparatory ---.

Col. 12, line 68, "drived" should be --- derived ---.

Signed and Sealed this

Twenty-second Day of October, 1991

*Attest:*

HARRY F. MANBECK, JR.

*Attesting Officer*  *Commissioner of Patents and Trademarks*